United States Patent [19]

Yamamoto

[11] Patent Number: 5,267,049
[45] Date of Patent: Nov. 30, 1993

[54] IMAGE QUALITY ADJUSTING APPARATUS PROVIDED FOR COPYING MACHINE

[75] Inventor: Kazushi Yamamoto, Kita-Katsuragi, Japan

[73] Assignee: Sharp Kabushiki Kaisha, Osaka, Japan

[21] Appl. No.: 841,618

[22] Filed: Feb. 25, 1992

[30] Foreign Application Priority Data

Feb. 28, 1991 [JP] Japan .................... 3-34505

[51] Int. Cl.$^5$ .............. H04N 1/21; H04N 1/23; H04N 1/40
[52] U.S. Cl. .................. 358/406; 358/444; 358/448; 358/296; 358/401
[58] Field of Search ............. 358/296, 80, 444, 408, 358/406, 401, 443, 448; 355/208

[56] References Cited

U.S. PATENT DOCUMENTS

| | | |
|---|---|---|
| 4,700,236 | 10/1987 | Abe . |
| 4,831,415 | 5/1989 | Kasuya . |
| 4,959,669 | 9/1990 | Haneda et al. ............ 358/80 |
| 5,038,208 | 8/1991 | Ichikawa ............... 358/80 |

FOREIGN PATENT DOCUMENTS

| | | |
|---|---|---|
| 0139174 | 5/1985 | European Pat. Off. . |
| 0269033 | 6/1988 | European Pat. Off. . |
| 3-233576 | 10/1991 | Japan . |
| WO/8804503 | 6/1988 | World Int. Prop. O. . |

OTHER PUBLICATIONS

Patent Abstracts of Japan, Publication No. 59-57264 (A), Publication Date Apr. 1984.
Patent Abstracts of Japan, Publication No. 60-247659 (A), Publication Date Dec. 1985.

*Primary Examiner*—Edward L. Coles, Sr.
*Assistant Examiner*—Scott A. Rogers
*Attorney, Agent, or Firm*—David G. Conlin; Robert F. O'Connell

[57] ABSTRACT

An image quality adjusting apparatus provided for a copying machine having a capability of adjusting copied image quality of an original, includes a unit for reading image data, a first storing unit for storing image data of the original read by the reading unit, a second storing unit for storing image data of a copied sheet read by the reading unit, the copied sheet being copied by the copying machine, and a unit for deriving correction data by means of comparing the original image data stored in the first storing unit with the copied sheet image data stored in the second storing unit, and amending the original image data on the basis of the derived correction data.

7 Claims, 4 Drawing Sheets

IMAGE QUALITY ADJUSTING APPARATUS PROVIDED FOR COPYING MACHINE

BACKGROUND OF THE INVENTION

1. Field of the Invention

The present invention relates to an image quality adjusting apparatus used for a digital copying machine, and more particularly to the image quality adjusting apparatus which is capable of treating color quality of an image copied on paper.

2. Description of the Related Art

The present inventor knows that some color copying machines have provided an image quality adjusting apparatus for adjusting color quality of an image copied on paper. As a representative related art of the image quality adjusting apparatus, the invention disclosed in the International Publication No. WO88/04503 may be referred. This image quality adjusting apparatus is arranged to have a unit for generating a first electric signal of a test image having predetermined patterns standing for some quality factors such as a color tone, a unit for printing the test image, a unit for generating a second electric signal from the printed image, and a unit for comparing the first electric signal with the second electric signal and adjusting a process parameter to reduce to a minimum the difference between the actual test image and the copied image.

Hence, the foregoing image quality adjusting apparatus has a capability of automatically adjusting quality of an image copied on paper by using the predetermined test image if the copying machine gradually degrades on time and disables to keep the initial quality on all the printed images because of changeable environmental conditions.

As mentioned above, such an image quality adjusting apparatus for a color copying machine uses the method of comparing a predetermined test image with its printed image on paper for adjusting the color quality of a printed image. If, therefore, the test image is different from the actual printed color image, the image quality adjusting apparatus cannot carry out fine adjustment of the color quality of the printed image.

In actual, the printed color image contains so many color tones like a half tone that a predetermined test image cannot stand for them rigorously. Hence, it is difficult to amend all these color tones only by securing reproducibility of slight patterns on the test image. It means that the use of the predetermined test image disadvantageously does not reach fine adjustment of the quality of the image copied on paper.

SUMMARY OF THE INVENTION

It is therefore an object of the present invention to provide an image quality adjusting apparatus provided for a copying machine which is capable of adjusting quality of an image copied on paper rigorously.

The object of the invention can be achieved by an image quality adjusting apparatus provided for a copying machine having a capability of adjusting copied image quality of an original, including:

a unit for reading image data;

a first storing unit for storing image data of the original read by the reading unit;

a second storing unit for storing image data of a copied sheet read by the reading unit, the copied sheet being copied by the copying machine; and a unit for deriving correction data by means of comparing the original image data stored in the first storing unit with the copied sheet image data stored in the second storing unit, and amending the original image data on the basis of the derived correction data.

In operation, the reading unit serves to read the image data of the original to be copied. The read original image data is stored in the first storing unit. Next, the image data about the copied sheet being copied by the copying machine is read by the reading unit. The copied sheet image data is stored in the second storing unit. Then, by comparing the original image data with the copied sheet image data, the deriving and amending unit serves to derive the correction data. Based on the correction data, the image data of the original is amended so that the copied image quality of the original is allowed to be rigorously adjusted.

Further objects and advantages of the present invention will be apparent from the following description of the preferred embodiments of the invention as illustrated in the accompanying drawings.

DESCRIPTION OF THE PREFERRED EMBODIMENTS

Figure 1:
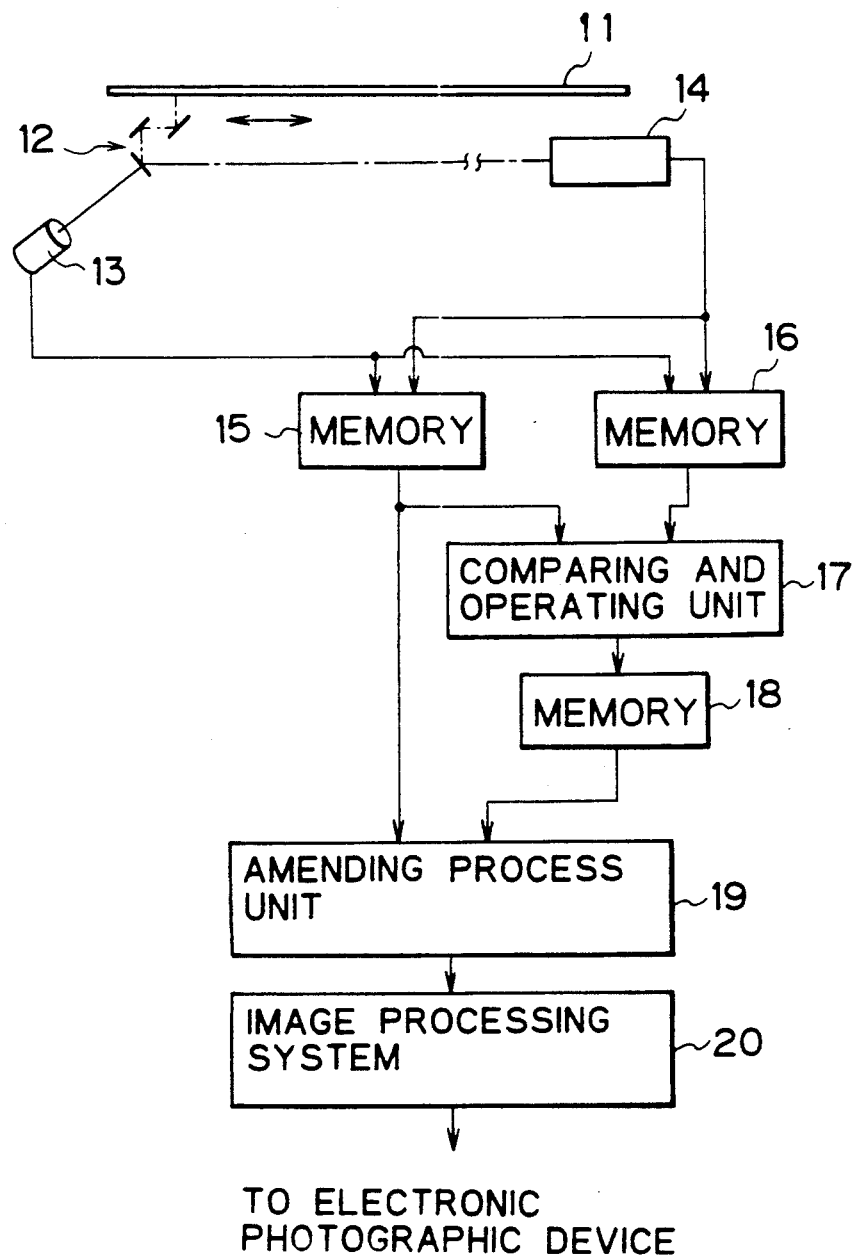
FIG. 1 is a block diagram showing an image quality adjusting apparatus according to an embodiment of the present invention.

Hereafter, an embodiment of the invention will be described as referring to the drawings.

FIG. 1 is a block diagram showing an image quality adjusting apparatus for a copying machine according to an embodiment of the invention.

As shown in FIG. 1, the image quality adjusting apparatus is arranged to have an optical system 12, a motor 13, a charge coupled device (CCD) sensor 14, memories, 15, 16, 18, a comparing and operating unit 17, an amending process unit 19, and an image processing system 20.

The copying machine is constructed as follows. A colored original (not shown) is placed on a platform 11 in a manner to direct the surface of the origial downwardly. The copied paper is also placed on the platform 11. Below the platform 11, the optical system 12 is located for scanning the original and the copied image on paper. The optical system 12 is arranged to move in bidirectional manner (in the direction shown by an arrow) and in parallel to the platform 11 by virtue of the motor 13.

The CCD sensor 14 is arranged to resolve the image data about the original and the image data about the copied image read by the optical system 12 into three color signals of red (R), green (G) and blue (B). To obtain these color signals, it is possible to employ the known method of switching the colors of the light source (not shown) of the optical system 12 or using the CCD sensor corresponding to each color.

The memory 15 is arranged to store two kinds of data of each color signal and a position signal. Each color signal is composed by resolving the image data of an original (referred to as original image data) sent out from the CCD sensor 14. The position signal is being given and sent from the motor 13 as the optical system 12 is scanning the original. This memory 15 may use a random access memory.

The memory 16 is arranged to store two kinds of data, that is, the data of each color signal and a position signal. Each color signal is composed by resolving the image data of a copied sheet (referred to as copied-sheet image data) sent out from the CCD sensor 14. The position signal is being given and sent from the motor 13 as the optical system 12 is scanning the copied sheet. This memory 16 may use a random access memory as well.

The comparing and operating unit 17 operates to compare the image quality of the original with that of the copied sheet and to derive a proper correction value A about the image data of the original so that the image quality of the original and that of the copied sheet are equivalent, based on the original image data and the copied-sheet image data stored in the memories 15 and 16, respectively.

The memory 18 is arranged to store the data of the correction value A about the original image data sent from the comparing and operating unit 17. This memory 18 may use a random access memory as well.

After deriving the correction value A, the amending process unit 19 serves to read the original image data of each color from the memory 15 in doing the copying function and amend the original image data of each color on the basis of data of the correction value A stored in the memory 18.

The image processing system 20 serves to process the original image data of each color amended by the amending process unit 19 and generate signals for cyan (C), magenta (M), yellow (Y) and black (B) on the basis of the processed original image data. Those signals are sent to an electro-photographic device (not shown) provided for color copying.

In addition, it is possible to output control signals such as a modulating signal of a laser beam for each color, a developing bias signal and a main charger output signal.

This electro-photographic device is arranged to have a photosensitive body for forming an electrostatic latent image of each color, a main charger for pre-charging the photosensitive body, a laser unit for exposing a surface of the photosensitive body by means of applying a laser beam corresponding to each color to the photosensitive body, a unit for developing the electrostatic latent image of each color by toner, a transfer unit for transferring a toner image formed on the surface of the photosensitive body onto a sheet, and a fixer for fixing the toner image transferred onto the sheet. The modulating signal of a laser beam, the developing bias signal and the main charger output signal are sent to the laser unit, the developing unit, and the main charger for controlling them.

Figure 2:
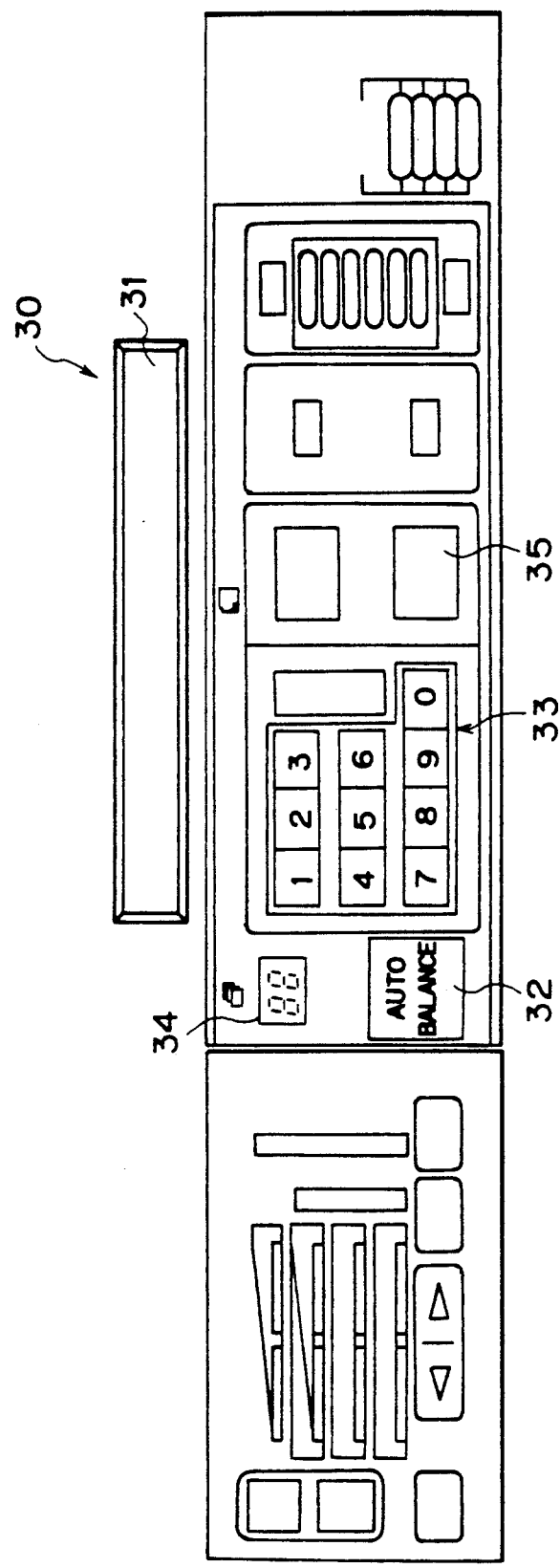
FIG. 2 is a plane view showing a display panel provided in the image quality adjusting apparatus.
Figure 3:
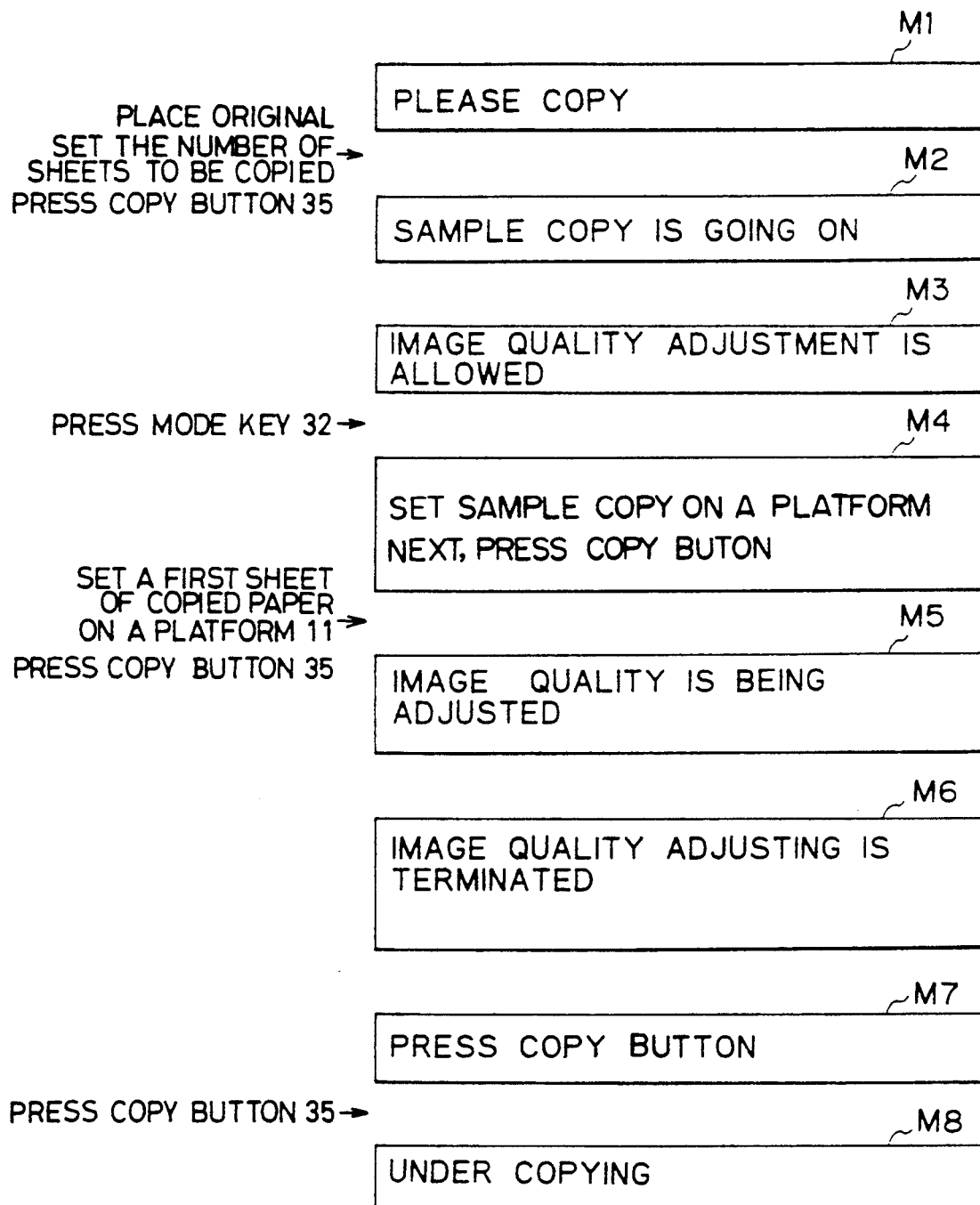
FIG. 3 is an explanatory view showing the examples of messages appearing on the display panel.

FIG. 2 is a plane view showing an operation panel provided in the image quality adjusting apparatus shown in FIG. 1. FIG. 3 is an explanatory view showing the examples of the messages appearing on the operation panel shown in FIG. 2.

As shown in FIG. 2, the image quality adjusting apparatus includes an operation panel 30. The operation panel 30 includes a display 31 for displaying several messages M1 to M8 to the users, a mode key 32 for selecting an image quality adjusting mode (an auto-balancing mode), a template keyboard 33 by which figures such as a number of necessary copied sheets are input, another display 34 for displaying the number of necessary sheets input by the template keyboard 33 or the current remaining number, for example, and a copy button 35 by which the copying operation is started.

Figure 4:
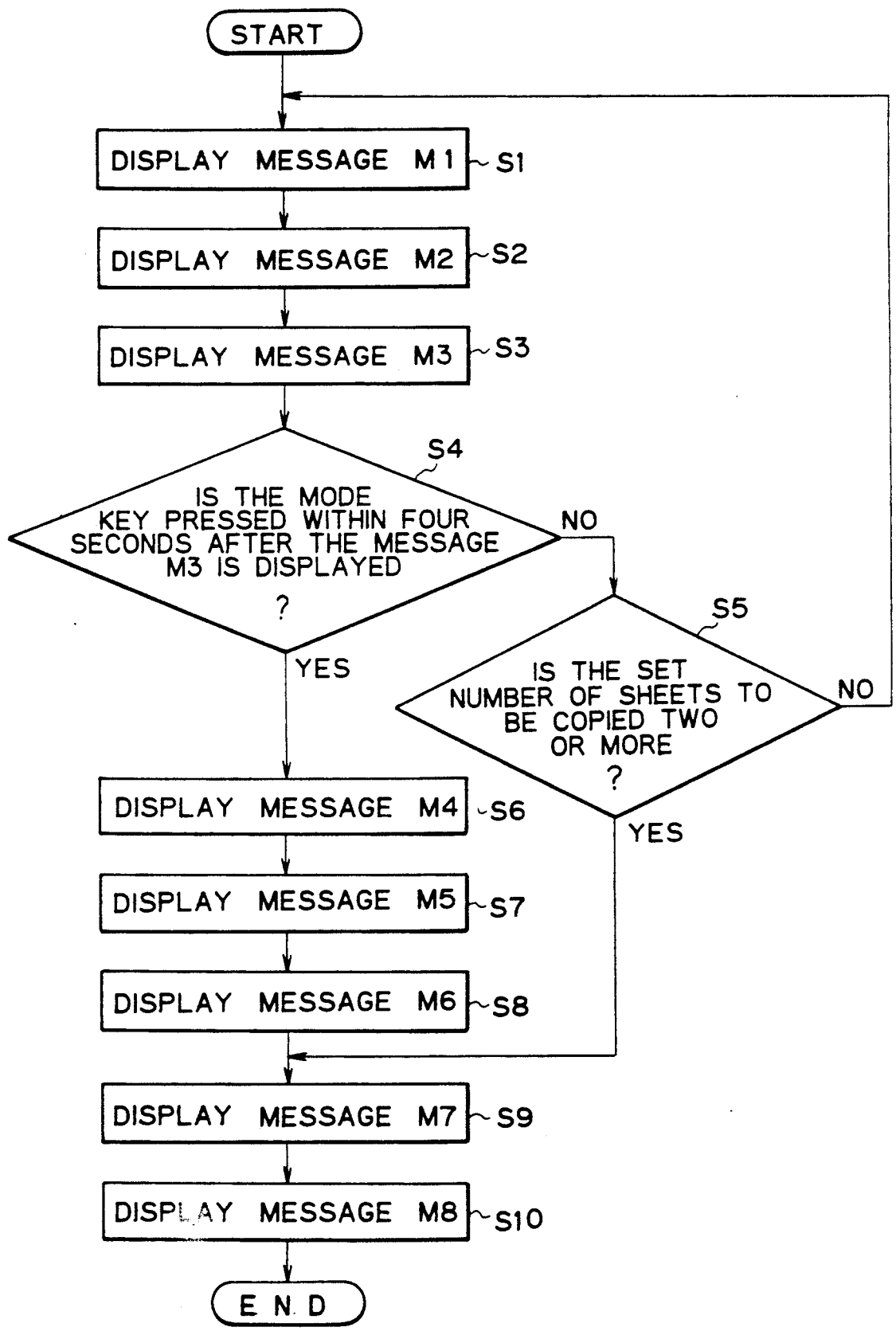
FIG. 4 is a flowchart showing the sequence of the message examples according to the operating stages of the image quality adjusting apparatus.

FIG. 4 is a flowchart showing the sequence of the messages displayed on the display 31 in accordance with the operation of the image quality adjusting apparatus shown in FIG. 1.

With reference to FIGS. 1 to 4, the description will be directed to the operation of the embodiment.

When the copying machine remains in the standby state, as shown in FIG. 3, the message M1 of "Please copy" is displayed on the display 31 at first (step S1).

Next, a sample colored original is placed on the platform 11. The number of sheets to be copied is set through the template keyboards 33. Then, the copy button 35 is pressed. In this state, as shown in FIG. 1, the optical system 12 scans the original for reading the original image data. The original image data is resolved to the color signals in the CCD sensor 14. Each color signal data is stored in the memory 15.

Each color signal data is output to the image processing system 20 directly, that is, without amendment by means of the amending process unit 19, so that the electro-photographic device enables to copy the sample original image on the sheet. In copying this original image, as shown in FIG. 3, the message M2 of "Sample copy is going on" is displayed on the display 31 (step S2). When terminating the copying, there is displayed on the display 31 the message M3 of "Image quality adjustment is allowed" indicating that an image quality adjustment mode is selectable (step S3).

Turning to a step S4, within for example four seconds after the message M3 is displayed, it is determined whether or not the mode key 32 for selecting the image quality adjusting mode is pressed.

If the mode key 32 is pressed within four seconds after the message M3 is displayed, the process goes to a step S6 but if not, to a step S5.

At the step S5, it is determined whether or not the set number of the sheets to be copied is two or more. If yes, the process goes to a step S9 at which the message M7 of "Press copy button" is displayed on the display 31. Then, the remaining number of the sheets to be copied is displayed on the display unit 34.

If the set number of the sheets to be copied is not two or more, that is, one or 0, the process returns to the step S1 at which the message M1 is displayed on the display 31. The original image data of each color is erased from the memory 15 immediately when the copy button 35 is pressed in the next copying operation. The new original image data of each color is stored in the memory 15.

At the step S6, as shown in FIG. 3, there is displayed on the display 31 the message M4 of "Set sample copy on a platform. Next, press copy button." for guiding the copied sheet.

When, in this state, the copied sheet is placed on the platform 11 and the copy button 35 is pressed, the optical system 12 operates to scan the copied sheet for reading the copied-sheet image data. The read copied-sheet image data is resolved to the color signals through the effect of the CCD sensor 14. Next, each color signal data is stored in the memory 16.

The comparing and operating unit 17 serves to read the original image data of each color stored in the memory 15 and the copied-sheet image data of each color stored in the memory 16, and to compare the quality of the original image with that of the copied sheet by collating the original image data of each color stored in the memory 15 to the copied-sheet image data of each color stored in the memory 16. From the compared result, the comparing and operating unit 17 operates to derive the proper correction value A of the original image so that the quality of the original image data is made equivalent to that of the copied-sheet image data. Then, the comparing and operating unit 17 sends the data of the correction value A to the memory 18. As a result, the data of the correction values A are accumulated in the memory 18.

In this state, as shown in FIG. 3, the message M5 of "Image quality is being adjusted" is displayed on the display 31 (step S7). When terminating the image quality adjusting operation, the message M6 of "Image quality adjusting is terminated" is displayed on the display 31 (step S8).

Then, as shown in FIG. 3, the message M7 of "Press copy button" is displayed for indicating the start of the copying operation (step S9).

In this state, when the copy button 35 is pressed, the amending process unit 19 serves to read the original image data of each color from the memory 15 and adjust the original image data of each color on the basis of the data of the correction values A stored in the memory 18.

Next, the image processing system 20 operates to process the original image data of each color amended by the amending process unit 19 for the purpose of generating color signals of cyan (C), magenta (M), yellow (Y), and black (B). Those color signals are output to the electronic photographic device for color copying (not shown).

When the copying operation is being performed, as shown in FIG. 3, the message M8 of "Under copying" is displayed on the display 31 (step S10).

If the mode key 32 is pressed at the step S5, the copying machine operates in the image quality adjusting state to copy the original on the number of copying sheets set through the template keyboard 33. If the mode key 32 is not pressed, the copying machine operates to copy the original on the copying sheets in the image quality non-adjusting state. In the latter case, however, the copying sheets on which the original is copied are limited to the set number minus one.

According to the foregoing embodiment, the original image data of each color is compared with the copied-sheet image data of each color for adjusting the image quality. As such, it is possible to fine adjust the copied image quality of the color original containing numberless color tones like a halftone.

The foregoing description has been expanded on the assumption that the original is colored. However, the image quality adjusting apparatus according to the invention may apply to the automatic adjustment of copied image quality of the monotone original.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image quality adjusting apparatus for use in a copying machine in order to adjust the copied image quality of an original, said apparatus comprising:
    means for reading image data;
    a first storing means for storing image data of said original read by said reading means;
    a second storing means for storing image data of a copied sheet read by said reading means, an image of said original being copied on the copied sheet by said copying machine;
    means for setting an image quality adjustment mode after the image of said original is copied; and
    means for deriving correction data by comparing the image data of said original stored in said first storing means with the image data of said copied sheet stored in said second storing means, and correcting the image data of said original on the basis of the derived correction data, said deriving means being adapted to derive the correction data when the image quality adjustment mode is set by said setting means within a predetermined time after the image of said original is copied.

2. An image quality adjusting apparatus according to claim 1, wherein said reading means includes an optical system.

3. An image quality adjusting apparatus according to claim 1, wherein each of said first and second storing means includes a random access memory.

4. An image quality adjusting apparatus according to claim 1, further comprising a display panel for indicating several messages for each operating stage.

5. An image quality adjusting apparatus according to claim 1, wherein said original is colored.

6. An image quality adjusting apparatus according to claim 5, further comprising means for resolving the image data of said original into three colors, red, green, and blue.

7. An image quality adjusting apparatus according to claim 6, wherein said resolving means includes a CCD sensor.

* * * * *